Patented Nov. 1, 1949

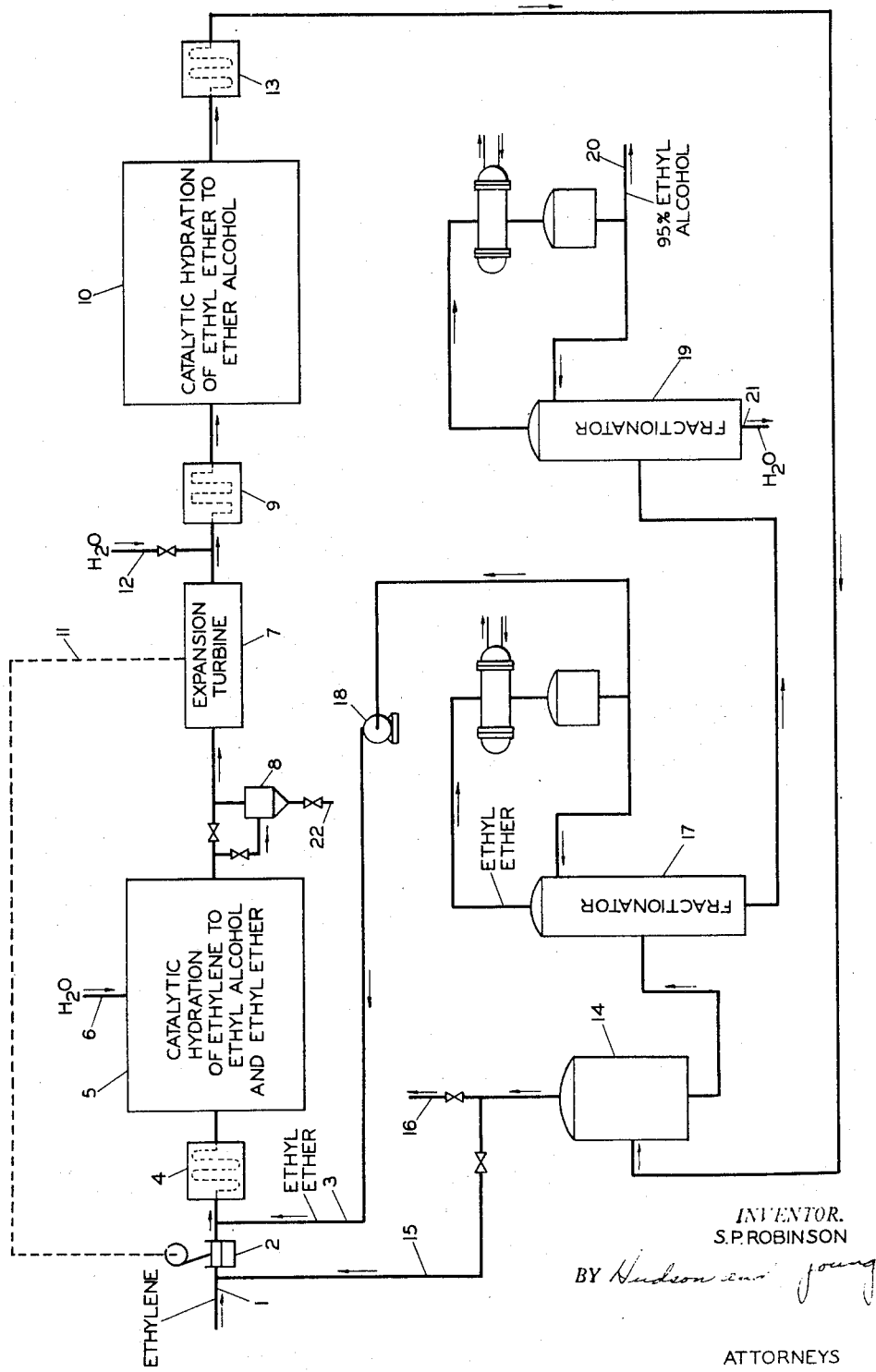

2,486,980

UNITED STATES PATENT OFFICE 2,486,980

CATALYTIC VAPOR PHASE HYDRATION OF ETHYLENE

Sam P. Robinson, Bartlesville, Okla., assignor to Phillips Petroleum Company, a corporation of Delaware Application February 1, 1946, Serial No. 644,951

2 Claims. (Cl. 260—641)

This invention relates to the production of ethyl alcohol from ethylene and ethylene-rich streams. More particularly it relates to a method for the production of ethyl alcohol from ethylene wherein the yield of ethyl alcohol is increased. Still more particularly it relates to such a method wherein high conversion of ethylene per pass is obtained and high yield of ethyl alcohol from the converted ethylene is obtained by converting the ethyl ether produced at such high per pass conversion to ethyl alcohol.

In the catalytic hydration of ethylene to ethyl alcohol, which is usually conducted in the vapor phase, the employment of high pressures is necessary to force the hydration. At pressures which are thermodynamically favorable to high conversion of ethylene per pass, the equilibria are such that considerable ethyl ether is formed. This is objectionable because ethylene is consumed in the formation of ethyl ether for which there is relatively little demand. My invention relates to a method of obviating this objection to previous methods.

The principal object of the present invention is to provide a process for the production of ethyl alcohol from ethylene wherein ultimate production of ethyl ether is greatly reduced or eliminated. Another object is to provide a process as in the foregoing wherein a higher percentage of the ethylene reacted is ultimately converted to ethyl alcohol. Another object is to attain the advantages of high per pass conversion of ethylene without at the same time producing a large amount of ethyl ether. Another object is to provide a two-stage process wherein optimum conditions can be employed in each stage and wherein no separation between stages is employed. Another object is to provide a process as in the foregoing which is integrated and unitary. Another object is to provide for the carrying out of one step in the process at high pressure with provision for conservation of power so that a large part of the expense of compressing the incoming gases is eliminated. Another object is to provide a process of the foregoing type wherein formation of undesirable ethyl ether is substantially depressed in the ethylene conversion. Numerous other objects will be apparent to those skilled in the art from this description taken in conjunction with the drawing and the appended claims.

The drawing is a diagrammatic representation of one arrangement of equipment which may be employed advantageously in carrying out my invention.

In one aspect, my invention is a process of producing ethyl alcohol which comprises contacting gaseous ethylene at high pressure and at moderately elevated temperatures with an ethylene hydration catalyst and in the presence of water under such conditions that hydration of said ethylene to ethyl alcohol and ethyl ether is the principal reaction, substantially immediately reducing the pressure of the total gaseous effluent and raising the temperature of said total gaseous effluent, contacting said total gaseous effluent at the resulting pressure and temperature with a second hydration catalyst which is capable of hydrating ethyl ether to ethyl alcohol, in the presence of water and under conditions such that hydration of said ether to ethyl alcohol is the principal reaction and recovering ethyl alcohol from the resulting effluent.

My invention involves the two-stage catalytic hydration of ethylene to ethyl alcohol. In the first stage ethylene is hydrated at high pressure to ethyl alcohol and ethyl ether. Use of high pressures for this step is advantageous because it forces the hydration of ethylene, giving high per pass conversion. However, it also causes the formation of large amounts of ethyl ether for which there is little demand. In accordance with my invention the entire effluent from the first stage conversion is reduced to a low pressure and is heated to a temperature which preferably is above the temperature used in the first stage and is then subjected to catalytic hydration to convert the ethyl ether content of the effluent to ethyl alcohol.

No separation is practiced between the two hydration stages with the sole exception that any liquid phase appearing in the reaction effluent may be separated before the expansion. Such a liquid phase may be one of entrained liquid catalyst where a liquid catalyst is employed for the first stage hydration. Or such a liquid phase may be one of water where the first stage hydration takes place under mixed phase conditions. It is preferred to separate such a liquid phase before reducing the pressure especially in the preferred case wherein the pressure reduction is effected by expansion through a turbine for generation of power for compressing the feed to the first stage. If such a liquid phase is composed of harmless materials such as water containing in solution ethyl alcohol and ethyl ether, as is the case when a solid non-fugitive hydration catalyst and mixed phase conditions are used, its separation may be omitted. In such a case the aqueous liquid phase may be converted to the gaseous phase by the reduction in pressure and elevation of temperature before passage to the second or ether hydration stage. It is preferred not to pass any aqueous liquid phase into the pressure reduction step and subsequent steps if said aqueous liquid phase contains liquid catalyst which would be corrosive if the liquid catalyst were an inorganic acid as would usually be the case.

The avoidance of any separation or fractionation step, such as separation of ethyl alcohol, between the hydration stages is highly advantageous because it greatly simplifies the process and reduces equipment and labor costs.

The first stage hydration may be carried out in any manner which effects substantial conversion of the ethylene to ethyl alcohol and ethyl ether. It is conducted in such a way that a substantial proportion of the hydration product is ethyl ether. In many cases the ethyl ether may run as high as 50 per cent or more of the combined ethyl alcohol and ethyl ether produced in the first stage.

The first stage is carried out at high pressures. Preferably pressures of at least 1000 pounds per square inch absolute are employed. The pressure may range from 1000 to 5000 pounds per square inch absolute or may be even higher than the upper limit given. Use of high pressures forces the hydration of the ethylene so that per pass conversion is higher. At the same time such high pressures cause an increase in the amount of ether formed. My invention overcomes the disadvantage of high hydration pressures in a simple and novel manner.

I prefer to conduct the first stage at relatively low temperatures, that is at not above 600° F. The temperature may range from 200° F. to 600° F. Temperatures appreciably below 200° F. are seldom desirable because the conversion rate becomes too low. Temperatures above 600° F. are undesirable because alcohol formation is reduced at such temperatures.

Any suitable ethylene hydration catalyst known to the art now or in the future may be used in the first hydration stage. Examples are metal phosphates, phosphoric acid supported on a suitable carrier such as diatomaceous earth, aqueous hydrofluoric acid (described and claimed in the copending application of F. E. Frey, Serial No. 521,833, filed February 10, 1944, now Patent No. 2,484,702), aqueous sulfuric acid, aqueous phosphoric acid, aqueous fluophosphoric acid, etc. It is generally preferred to use a solid catalyst, especially a solid non-fugitive catalyst. However I may employ a liquid catalyst such as an aqueous solution of an inorganic acid.

The ethylene feed may be any suitable ethylene-containing stream. I prefer a fairly concentrated ethylene stream. Thus the ethylene-containing gas should contain at least 50 mol per cent of ethylene on a dry basis. Inert and unobjectionable diluent gases such as hydrogen, methane and ethane may be present in the feed. Propane and heavier paraffins are usually substantially absent although they may be present in small amounts. The ethylene feed must be free from olefins higher than ethylene, from diolefins and from acetylenes. It should be free from sulfur-containing and nitrogen-containing compounds.

It is preferred to carry out the first hydration step in the vapor phase, that is under conditions such that both the ethylene and the water as well as the ethyl alcohol and ethyl ether present and produced by the reaction are substantially entirely in the gaseous state. Vapor phase operation is easily attained. Apparently the properties of the reaction mixture are such that it is in the vapor phase under the high pressure of 1000 or more pounds per square inch absolute and at the temperature employed which is usually from 200 to 600° F. as stated above. It may be that retrograde phenomena cause the reaction mixture to be in the vapor phase under these conditions. For example as the pressure on the system in question is increased it may possibly be that it goes through a liquid phase and then by retrograde vaporization passes into the vapor phase.

The system is very complex from the standpoint of predicting critical temperature and phase relationships and I am not limited to any explanation. In fact I am not limited to exclusive vapor phase operation. Under some conditions the operation may be of the mixed phase type, that is with liquid and vapor phases of the reaction mixture in equilibrium with one another. I prefer however that the reaction mixture be substantially or completely in the vapor phase.

For several reasons I often prefer to employ a solid non-fugitive catalyst and conditions such that the reactants and products in the first hydration are entirely in the vapor phase. This avoids the complications due to a separate liquid phase such as would obtain if a liquid catalyst were used. When a solid catalyst is used no problem of entrainment of liquid catalyst in the effluent gas is presented. This would require separation before expansion and further processing and also would deplete the catalyst in the first stage.

Water must of course be present in the first hydration step in order to react with the ethylene. I prefer to supply water continuously to the reaction zone. The water may be fed directly to the reactor but more commonly I mix it with the ethylene feed. In a typical embodiment steam and ethylene may be admixed to give the molar ratio desired in the hydration, the mixture compressed to the desired pressure and brought to the desired reaction temperature and fed to the first hydration step. Usually the compressed mixture will require the removal of heat due to compression therefrom prior to entering the reaction zone. The recycle ethyl ether stream, derived from the second stage effluent as hereinafter described, may be admixed in liquid form with compressed gaseous mixture intermediate the compressors and the coolers, and will additionally serve to cool the mixture.

I prefer to employ a considerable molar excess of steam with respect to the ethylene reacted in the first stage. Commonly the per pass conversion of ethylene in the first hydration step will not exceed 20-25 per cent. In addition to the economic advantage of limiting the per pass conversion of ethylene to not over 25 per cent, this feature is further desirable because it provides unreacted ethylene for the second stage where it prevents dehydration of ethyl alcohol. The desired excess of steam may be obtained by employing from 1 to 5 moles of steam per mol of ethylene charged to the first stage. Use of a molar excess of steam with respect to ethylene charged is generally preferred.

The employment of steam in excess of that reacted with the ethylene in the first stage of hydration is preferable for a number of reasons, among which are that it forces the hydration of ethylene, it suppresses polymerization of ethylene and it increases the proportion of ethyl alcohol formed relative to ethyl ether.

Recovery of the ethyl ether appearing in the second stage effluent and recycle thereof to the first stage is highly desirable because it markedly depresses the formation of ethyl ether in the first stage hydration and thus considerably increases the ultimate yield of ethyl alcohol.

Since the reaction is exothermic, suitable means for cooling the first stage converter are preferably provided. This means may take any desired form. If desired the water may be introduced in liquid form directly into the converter thereby effecting some cooling. Likewise the ether recycle stream may be injected directly into the reaction zone. Any other suitable means for maintaining the temperature in the reaction zone constant may be employed.

The effluent from the first stage hydration is reduced to a low pressure, not over 100 pounds per square inch gauge, as soon as possible, that is immediately or substantially immediately upon leaving the first converter. No separation step or steps are interposed between the first stage and the second hydration, with the sole exception that I prefer to separate any liquid phase from the gaseous effluent before going into the expansion turbine or other pressure reduction means. Thus any entrained liquid catalyst phase should be removed to avoid corrosion and other difficulties in the expansion step. Such a liquid phase may be separated in a very simple manner, for example by passage through an ordinary trap which effects the separation without reducing the pressure or temperature of the effluent.

I prefer to accomplish the pressure reduction by expansion of the gaseous effluent through a turbine thereby recovering a large proportion of the energy contained therein as power. Any suitable form of turbine may be employed. Instead of a turbine any other means of generating power from a high pressure gas may be employed. I prefer to use the power thus generated to drive the compressors for compressing the ethylene feed. In this way the horsepower requirements for the compression step which might otherwise be prohibitively high are greatly reduced.

It is preferred to expand the gaseous effluent to a pressure of not over 100 pounds per square inch absolute. The pressure may range from atmospheric up to this figure. The gases are then heated to the temperature desired to be maintained in the second or ether hydration stage and are then passed into this conversion step. Desirably water in the form of steam may be introduced to the gaseous mixture intermediate the pressure reduction step and the preheating step thereby reducing the amount of preheat required to be supplied.

Whereas the first stage reaction involved principally or exclusively the hydration of ethylene to ethyl alcohol and ethyl ether and is preferably carried out at conditions favoring high per pass conversion of ethylene in spite of large concomitant ether formation, the second stage reaction is principally or exclusively the hydration of ethyl ether to ethyl alcohol and conditions in this step are so controlled that this reaction selectively occurs.

In accordance with my invention selective hydration of the ethyl ether to ethyl alcohol in the second stage is effected by employing pressure, temperature, and excess of water which favor this reaction in preference to other reactions.

Ordinarily the pressure employed in the second stage will range from 5 pounds per square inch gauge up to 85 pounds per square inch gauge. The pressure should be sufficiently above atmospheric to force the reaction mixture through the converter. The temperature employed is substantially above that employed in the first stage and preferably ranges from 450 to 800° F.

Water should be present in the second stage reaction zone in amount not only sufficient for the reaction $$C_2H_5-O-C_2H_5 + H_2O \rightarrow 2C_2H_5OH$$

but also in sufficient excess thereabove to prevent dehydration of the ethyl alcohol to ethylene in accordance with the reaction $$C_2H_5OH \rightarrow C_2H_4 + H_2O$$

Ordinarily I prefer to employ water in an amount equal to from 1.5 to 10 mols per mol of ethyl ether present. The stated lower limit—1.5 moles—gives a 50 per cent excess over that required for hydration of all the ethyl ether. A mol ratio of steam to ethyl ether of 5 to 1 is very satisfactory. Ordinarily it is not economically feasible to convert all of the ether to alcohol, but is preferable to limit the per pass conversion to about 80 per cent of the ether. This is further advantageous in that it gives a substantial amount of ethyl ether which is available for recycle to the first stage for the very advantageous purpose of depressing ethyl ether formation in the first step.

The possible dehydration of ethyl alcohol to ethylene is further depressed by the existence of substantial concentrations of unreacted ethylene in the gases, said unreacted ethylene being present because of the limitation of per pass conversion of ethylene in the first stage.

Furthermore the dehydration of ethyl alcohol to ethylene is not nearly as vigorous as the decomposition of ethyl ether to ethyl alcohol. By proper selection of reaction conditions of temperature, pressure, composition of reactants, contact time, etc., it is easily possible to prevent appreciable conversion of ethyl alcohol to ethylene.

Any catalyst which is effective to hydrate ethyl ether to ethyl alcohol may be employed in the second stage. Examples are metallic oxides especially oxides of metals of groups II and III of the periodic system, such as beryllium, magnesium, calcium, barium, strontium, zinc, and aluminum. Aqueous catalysts may be used but are not preferred. Any other catalyst which effects hydration of ether and does not have deleterious effects or disadvantages may be used.

I have found that aluminum oxide in the form of activated alumina is the most satisfactory catalyst and this is by far the preferred catalyst. Activated alumina is a well-known article of commerce and may be made by calcining high-grade bauxite in such manner as to drive off combined water without injuring its catalytic activity. It may also be made by calcining the aluminum trihydrate which forms as a scale in the precipitation tanks used for alumina precipitation in the manufacture of metallic aluminum. For a detailed description of this form of activated alumina, attention is directed to U. S. Patents 1,868,869 and 2,015,593. Another form of activated alumina which may be employed is that which is prepared by calcining a good grade of natural bauxite at temperatures ranging up to 1200° F. to remove the combined water without injuring the catalytic activity. An excellent discussion of the activation of bauxite will be found in the article "Bauxite as a drying adsorbent" by W. A. La Lande, Jr., et al., appearing in Ind. and Eng. Chem. 36, pages 99–109 (1944). Activated alumina is a highly adsorptive form of gamma alumina and is a superior ethyl ether hydration catalyst.

The second stage is preferably operated under such conditions that at least a major portion of the ethyl ether present is converted to ethyl alcohol per pass. Conditions should be so adjusted that not more than 1 per cent of the ethyl alcohol is converted to ethylene per pass in this step. As indicated previously this conversion is carried out exclusively in the vapor phase.

The effluents from the second stage are withdrawn and cooled to liquefy ethyl alcohol, steam and residual ether which are separated from gaseous hydrocarbons comprising unconverted ethylene. The gaseous phase is preferably partially recycled and the balance is vented from the system to keep ethane and other inerts which were present in the original ethylene stream from pyramiding. If 100 per cent pure ethylene was used originally the entire gaseous phase may be recycled.

The liquid condensate is then topped in a fractionating column to separate the residual ether which is preferably recycled to the first stage to prevent excessive ether formation. If this recycle ether stream is introduced at a point after the ethylene compressors it must be pressured in by a positive-displacement high-pressure liquid pump.

The residual liquid condensate is then fractionated in the usual way to recover the ethyl alcohol content thereof as the product of the process.

I prefer to operate my process continuously, that is with continuous introduction of ethylene and water to the system and continuous withdrawal of ethyl alcohol from the system, the effluent from each step passing to the next step uninterruptedly and at a constant rate after equilibrium or steady state operation is attained. However, though far less preferably, I may operate in a batchwise manner.

Referring to the drawing, an ethylene-containing stream is fed to the system via line 1. This feed is compressed in compressors 2 to a pressure sufficient to maintain the desired pressure of at least 1000 pounds absolute in the first stage of conversion. The recycle ethyl ether stream may be injected via line 3 into the compressed ethylene stream. The stream may be further cooled in cooler 4 to remove the remainder of the heat of compression and thereby bring it to the proper temperature for introduction to catalytic converter 5. Water in any form may be introduced to converter 5 as diagrammatically indicated by line 6. Thus liquid water may be injected directly into converter 5, singly or multipointwise, to aid in keeping the temperature down to the proper level and supply water of reaction. Usually steam is introduced in admixture with the ethylene feed; for example steam and the ethylene feed may be admixed in the proper proportions and fed to compressors 2. Converter 5 is cooled in any suitable manner to remove the exothermic heat of reaction.

The effluents from converter 5 are passed directly to unit 7 in which they are expanded to a low pressure suitable to maintain the proper low pressure in the second stage converter 10. If any liquid be present, such as entrained liquid catalyst or a small amount of a liquid reaction mixture phase, it is preferably removed by passage through separator 8 prior to expansion in turbine 7. Turbine 7 recovers the energy of compression as power which is preferably used to supply a substantial or a major part of the power required to drive compressors 2, as is indicated by dotted line 11 which denotes any suitable power transmission means such as direct shafting, electric generators and motors, etc. for causing the power liberated by turbine 7 to drive compressors 2.

The expanded gaseous effluent is then, with or without injection of water in any form such as steam by means of line 12, heated in unit 9 to a temperature suitable for carrying out the ether hydration in unit 10.

The resulting mixture then passes through catalytic converter 10 wherein the major portion of the ethyl ether is hydrated to ethyl alcohol, all other reactions being substantially completely suppressed.

The effluent from converter 10 is cooled in condenser 13 to effect condensation of all the ethyl alcohol, ethyl ether and steam. The resulting mixture is separated in condensate accumulator or fractionator feed tank 14 into a gaseous phase of the non-condensible gases including unconverted ethylene and a liquid phase. The gaseous phase may be recycled via line 15. If desired, and usually it will be preferred, a portion may be continuously bled off from the system via line 16. It will be understood that where inert gases such as methane, ethane and hydrogen were present in the original feed the gaseous phase separated in unit 14 will be enriched in such gases and it will be necessary to withdraw a portion thereof which is sufficient to keep these inert gases from building up to an undesirable extent in the system. Usually the gaseous phase will be bled off at a rate such that the rates of introduction of inert gases to the system and removal of such gases from the system are equal. The stream withdrawn via line 16 may be passed to any suitable system (not shown) for recovery or concentration or utilization of its ethylene content.

The liquid phase separated in vessel 14 is passed to distillation column 17 where the ethyl ether is removed overhead. The overhead vapors are condensed to provide reflux in the usual way. The overhead product is pressured in liquid phase by means of pump 18 (which is of the positive-displacement high-pressure type) and line 3 into the conversion unit 5, conveniently at a point between compressors 2 and cooler 4 whereby the cooling effect of the liquid ether is imparted to the feed stream and the cooling requirements of cooler 4 are reduced.

The bottoms product of column 17 is passed to final product column 19 which separates it into a 95 per cent ethyl alcohol product stream withdrawn via line 20 and a bottoms product consisting essentially of water and leaving via line 21. This bottoms product of water may be employed as the source of water for the reaction in converter 5 and/or converter 10.

The material withdrawn from liquid phase separator 8 via line 22 may be passed to any suitable recovery or utilization system. Where it is principally liquid catalyst, it may be recycled to the converter 5 in any suitable way. Where it is predominantly or exclusively liquid phase reaction mixture, it may be subjected to pressure reduction in any suitable way as by passage through a pressure reducing valve and then passed around turbine 7 into admixture with the expanded gaseous phase fed to heater 9 and converter 10. Alternatively in such case it might be passed, after reduction to suitable pressure into the recovery system shown for recovery of its ethyl ether, ethyl alcohol and water contents.

*Example*

An ethylene-rich mixture of an ethylene-rich stream recovered from the effluent of thermal cracking of a hydrocarbon and a recycle ethylene stream recovered from a later point in the process as hereinafter described and containing 80 per cent ethylene, 15 per cent ethane, 3 per cent methane and 2 per cent hydrogen was passed through a catalyst reactor containing aqueous 20 per cent sulfuric acid to effect hydration of the ethylene to ethyl alcohol and ethyl ether. The pressure was 2500 pounds per square inch absolute and the temperature was maintained at 450° F. Water was introduced to the catalyst reactor at a rate sufficient to maintain the acid concentration at the 20 per cent figure. A recycle ether stream derived as hereinafter described was introduced with the makeup water. The per pass conversion of ethylene was 25 mol per cent.

The effluent after passage through a trap to remove any entrained liquid was passed through an expansion turbine to recover the power for compressing the gases fed to the reactor. This reduced the pressure to 25 pounds per square inch gage. The resulting gaseous stream was then mixed with steam in an amount equal to 5 mols per mol of ether. The mixture was heated to 700° F. and then contacted with activated alumina catalyst at the resulting temperature and pressure. The per pass conversion of ethyl ether to ethyl alcohol was 68 per cent.

The resulting effluent was then treated in the manner shown in the drawing to recover recycle ethylene and ether streams and the product ethyl alcohol. A portion of the uncondensed gas stream was continuously withdrawn from the system in the manner shown in the drawing in amount sufficient to keep the concentrations of inerts (methane, ethane and hydrogen) at a constant level.

From the foregoing detailed description many advantages of the process of my invention will be apparent to those skilled in the art. The principal advantage is that the invention combines a conversion step in which ethylene is hydrated under conditions which are substantially optimum for high per pass conversion of ethylene and a conversion step in which conditions are optimum for selectively converting a major proportion of the ethyl ether unavoidably formed in large amounts in the first conversion to ethyl alcohol, whereby the ultimate yield of ethyl alcohol is greatly enhanced. Another advantage is that no separation steps are applied between stages whereby costs are greatly reduced. Other advantages are that the process is simple and flexible and that the two conversion steps are individually controllable to obtain optimum conditions in each without deleteriously affecting the other conversion step or the rest of the process. Another advantage is that by recovering the energy from the effluent gas from the first stage and utilizing the power so generated to drive the compressors which compress the incoming ethylene feed, the power requirements of the process are greatly reduced in comparison to what they would be were standard practice followed.

Another advantage of the present invention is that objectionable side reactions in the two conversion steps are kept at a minimum in a simple and economical manner. A very marked advantage of the process is that the several steps cooperate with one another in such a way as to make a unitary, integrated process. This integration of steps is shown by the fact that ethylene, unconverted in the first stage, is used to prevent ethyl alcohol dehydration in the second stage and the fact that ethyl ether, not completely hydrated in the second stage, is used to provide recycle ether for the first stage whereby formation of ether therein is substantially depressed. Many other advantages of my invention will be obvious to those skilled in the art.

I claim:

1. The process of producing ethyl alcohol from ethylene which comprises contacting a mixture of ethylene and a stoichiometric excess of water up to 5 mols per mol of ethylene in the vapor phase at a pressure of at least 1000 pounds per square inch absolute and at a temperature of from 200 to 600° F. with a solid ethylene hydration catalyst under such conditions that the reaction mixture is maintained in the vapor phase throughout so as to effect hydration of up to 25 per cent of said ethylene to ethyl alcohol and ethyl ether as the principal reaction while allowing the remaining ethylene to pass through unreacted, withdrawing the resulting vaporous reaction mixture from the catalyst zone and immediately reducing the pressure of said mixture by expansion to not over 100 pounds per square inch absolute and heating the resulting mixture to a temperature substantially above that maintained in said contacting step, there being no separation applied to said reaction mixture, contacting the resulting mixture comprising ethyl ether, water, ethyl alcohol, and ethylene at the resulting pressure of not over 100 pounds per square inch absolute and at a temperature higher than that employed in said first hydration step and within the range of from 450 to 800° F. in a second zone with a solid ethyl ether hydration catalyst, maintaining from 5 to 10 mols water per mol of ethyl ether in said second zone, maintaining the reaction mixture in the vapor phase throughout said second zone and at a pressure of not over 100 pounds per square inch absolute and at a temperature ranging from 450 to 800° F. so as to effect hydration of a major proportion but not over 80 per cent of said ether to ethyl alcohol as the principal reaction despite the presence of ethyl alcohol in the reaction mixture and while converting not more than one per cent of the ethyl alcohol to ethylene, withdrawing the resulting vaporous reaction mixture from the second catalyst zone, recovering unreacted ethylene from the withdrawn mixture and recycling same to the first catalyst zone, recovering unconverted ethyl ether from the withdrawn mixture and recycling same to the first catalyst zone thereby suppressing formation of ethyl ether therein, and recovering ethyl alcohol from the withdrawn mixture.

2. The process of claim 1 wherein said solid ethyl ether hydration catalyst is an activated alumina.

SAM P. ROBINSON.

REFERENCES CITED

The following references are of record in the file of this patent:

UNITED STATES PATENTS

| Number | Name | Date |
|---|---|---|
| 1,602,846 | Burke | Oct. 12, 1926 |
| 1,873,538 | Brown | Aug. 23, 1932 |
| 1,951,740 | Shiffler | Mar. 20, 1934 |
| 2,050,442 | Metzger | Aug. 11, 1936 |
| 2,115,874 | Rehm | May 3, 1938 |
| 2,162,913 | Eversole et al. | June 20, 1939 |

OTHER REFERENCES

Ser. No. 373,690, Guinot (A. P. C.), published June 15, 1943.